US012732726B2

(12) United States Patent
Huss et al.

(10) Patent No.: US 12,732,726 B2
(45) Date of Patent: Sep. 8, 2026

(54) MODULAR CABINET SPEAKER SYSTEM

(71) Applicants: Adam Huss, Knoxville, TN (US); Dennis Huss, Knoxville, TN (US)

(72) Inventors: Adam Huss, Knoxville, TN (US); Dennis Huss, Knoxville, TN (US)

( * ) Notice: Subject to any disclaimer, the term of this patent is extended or adjusted under 35 U.S.C. 154(b) by 124 days.

(21) Appl. No.: 18/665,361

(22) Filed: May 15, 2024

(65) Prior Publication Data

US 2025/0358553 A1 Nov. 20, 2025

(51) Int. Cl.
*H04R 1/02* (2006.01)

(52) U.S. Cl.
CPC ............ *H04R 1/02* (2013.01); *H04R 2400/11* (2013.01); *H04R 2420/01* (2013.01)

(58) Field of Classification Search
CPC ... H04R 1/02; H04R 2400/11; H04R 2420/01
See application file for complete search history.

(56) References Cited

U.S. PATENT DOCUMENTS 4,365,688 A * 12/1982 Blose ..................... H04R 1/227 181/146
4,815,559 A * 3/1989 Shirley .................. H04R 27/04 381/186
5,547,272 A * 8/1996 Paterson ................. G06F 1/181 312/265.5
7,016,513 B2 * 3/2006 Noselli .................... H04R 5/02 381/345
7,201,251 B1 * 4/2007 Baird ..................... H04R 1/227 381/386
7,270,215 B2 * 9/2007 Stiles ................... H04R 1/2888 381/353
7,602,934 B2 * 10/2009 Zuccaro ................... H04R 1/02 381/345
10,904,650 B2 * 1/2021 Fujimori .................. H04R 1/02
2002/0146139 A1 * 10/2002 Oplinger .................. H04R 5/02 381/306
2003/0091206 A1 * 5/2003 Proni ....................... H04R 1/02 381/87
2006/0065476 A1 * 3/2006 Tasker ................... H04R 1/323 181/155
2007/0158134 A1 * 7/2007 Fryette ..................... H04R 1/02 181/148
2009/0196450 A1 * 8/2009 Hughes ................ H04R 1/2819 381/334
2014/0174847 A1 * 6/2014 Smith .................. H04R 1/2884 181/296
2019/0261087 A1 * 8/2019 Petracek .................. H04R 5/02
2020/0100007 A1 * 3/2020 D'Ascanio ............. H04R 1/025
2024/0357283 A1 * 10/2024 Yoshida .............. B60R 11/0217

* cited by examiner

*Primary Examiner* — Oyesola C Ojo

(57) ABSTRACT

A modular cabinet speaker system is provided which utilizes a cabinet housing having a top panel, a bottom panel, a left panel, and a right panel. The top panel, the bottom panel, the left panel, and the right panel may define a cabinet housing cavity interior. A front baffle may be disposed over and removably coupled to the top panel, the bottom panel, the left panel, and the right panel. The front baffle may utilize a top frame member, a bottom frame member, a left frame member, and a right frame member which are coupled to peripheral edges of a baffle portion. A rear baffle may be disposed over and removably coupled to the top panel, the bottom panel, the left panel, and the right panel.

20 Claims, 13 Drawing Sheets

MODULAR CABINET SPEAKER SYSTEM

BACKGROUND OF THE INVENTION

The current landscape of the modular cabinet speakers industry encompasses a variety of products designed to deliver audio solutions across diverse applications. This includes home entertainment systems, professional music production, and public address systems. Despite advancements in audio technology, users continue to seek improvements in sound quality, customization capabilities, and seamless integration with common household furnishings.

A significant gap exists in the market for modular cabinet speakers that offer a high degree of customization and flexibility. Users demand solutions that can adapt to various acoustic environments, personal preferences, and space constraints. Existing products often fall short in offering an optimal balance between sound quality, aesthetic appeal, and ease of modification.

In the evolving landscape of audio technology, particularly within the sector of modular cabinet speakers, users frequently encounter significant challenges related to sound customization and the upgradability of components. These limitations not only curtail the auditory experience but also hinder the adaptability of the system to future technological advancements. The complexity of upgrading or modifying components in existing modular cabinet speaker systems poses a substantial barrier, often requiring specialized knowledge or the assistance of a professional, thereby increasing the time and cost involved.

Furthermore, a critical examination of the current market offerings reveals a conspicuous absence of solutions that adeptly balance the management of internal space with the optimization of acoustic performance. This gap in the market is particularly notable in products striving to maintain a compact and aesthetically pleasing design. Existing systems frequently compromise on sound quality to achieve a smaller footprint or, conversely, necessitate larger, often cumbersome designs to enhance acoustic performance. This dichotomy presents a significant challenge for consumers seeking both high-quality customizable sound and a design that complements modern living spaces.

Traditional cabinet speaker systems have been notably deficient in providing users the capability to manually and mechanically adjust the acoustic properties of the speaker system. This limitation restricts users' ability to tailor sound output to specific environments or personal preferences, resulting in a one-size-fits-all solution that often falls short of delivering optimal sound quality. The inherent design of these systems lacks flexibility, making it impossible to modify the internal air volume or the shape and size of acoustic output ports, which are crucial for affecting the overall sound characteristics.

In stark contrast, the modular cabinet speaker system of the present invention introduces an advantageous solution that incorporates an adjustable acoustic output port. This innovative feature allows users to modify the internal air volume acoustics, thereby enabling a level of sound customization previously unattainable. Through manual mechanical adjustments, users can precisely control the bass response and the overall sound profile of the speaker system. This adjustability not only enhances the listening experience by allowing for the acoustic properties to be tailored to the listener's environment and preference but also demonstrates an advantageous advancement over existing technologies by introducing a more versatile and user-centric approach to sound optimization.

Existing cabinet speaker systems often fall short of seamlessly integrating into the diverse dimensions of common living room furniture, particularly when it comes to fitting within standard cabinet dimensions. This mismatch not only limits placement options but also detracts from the aesthetic harmony of living spaces, forcing users to compromise on either sound quality or interior design.

Addressing this significant drawback, the modular cabinet speaker system of the present invention advantageously offers a fixed form factor designed to match the most common living room cabinet dimensions, thereby eliminating the dilemma of fit versus aesthetics. Moreover, this system does not sacrifice customization for conformity; it advantageously accommodates user preferences through adjustable internal air volume acoustics. This dual approach ensures that while the outer dimensions of the speaker system harmonize with living room aesthetics, the internal acoustics remain highly adaptable, providing a tailored listening experience without compromising on form or function.

A common oversight in the design of existing cabinet speaker systems is the lack of consideration for acoustic vibrations when these systems are placed adjacent to or within household furnishings, such as living room cabinets. These overlooked vibrations can lead to disadvantageous sound distortion and may negatively impact both the output audio quality of the speaker system as well as the structural integrity of the furniture housing the system.

The modular cabinet speaker system of the present invention advantageously addresses this issue by incorporating acoustic seals and vibration-damping material layers between individual structural components of the speaker system, as well as between the speaker system as a whole and the household furnishing. This advantageous design minimizes the transmission of unwanted vibrations, ensuring that sound quality is preserved and that the furnishings remain undamaged. This utilization of anti-vibrational features represents an advantageous advancement in the compatibility of high-fidelity audio systems with home decor, enhancing both the aesthetic and auditory experience.

Overall, the development of a modular cabinet speaker system, as described herein, seeks to address these multifaceted challenges by introducing a platform that not only facilitates easy customization and upgrading of components but also ingeniously manages internal space to optimize acoustic performance without sacrificing compactness or aesthetic appeal. This innovative approach is advantageous to a user by offering a solution that aligns with the evolving needs and preferences of audiophiles and casual listeners alike, thereby filling a significant void in the current landscape of audio equipment.

DETAILED DESCRIPTION OF THE INVENTION

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a modular cabinet speaker system" or any of its constituent parts also includes a plurality of modular cabinet speaker systems or any of its constituent parts and the like.

Figure 1:
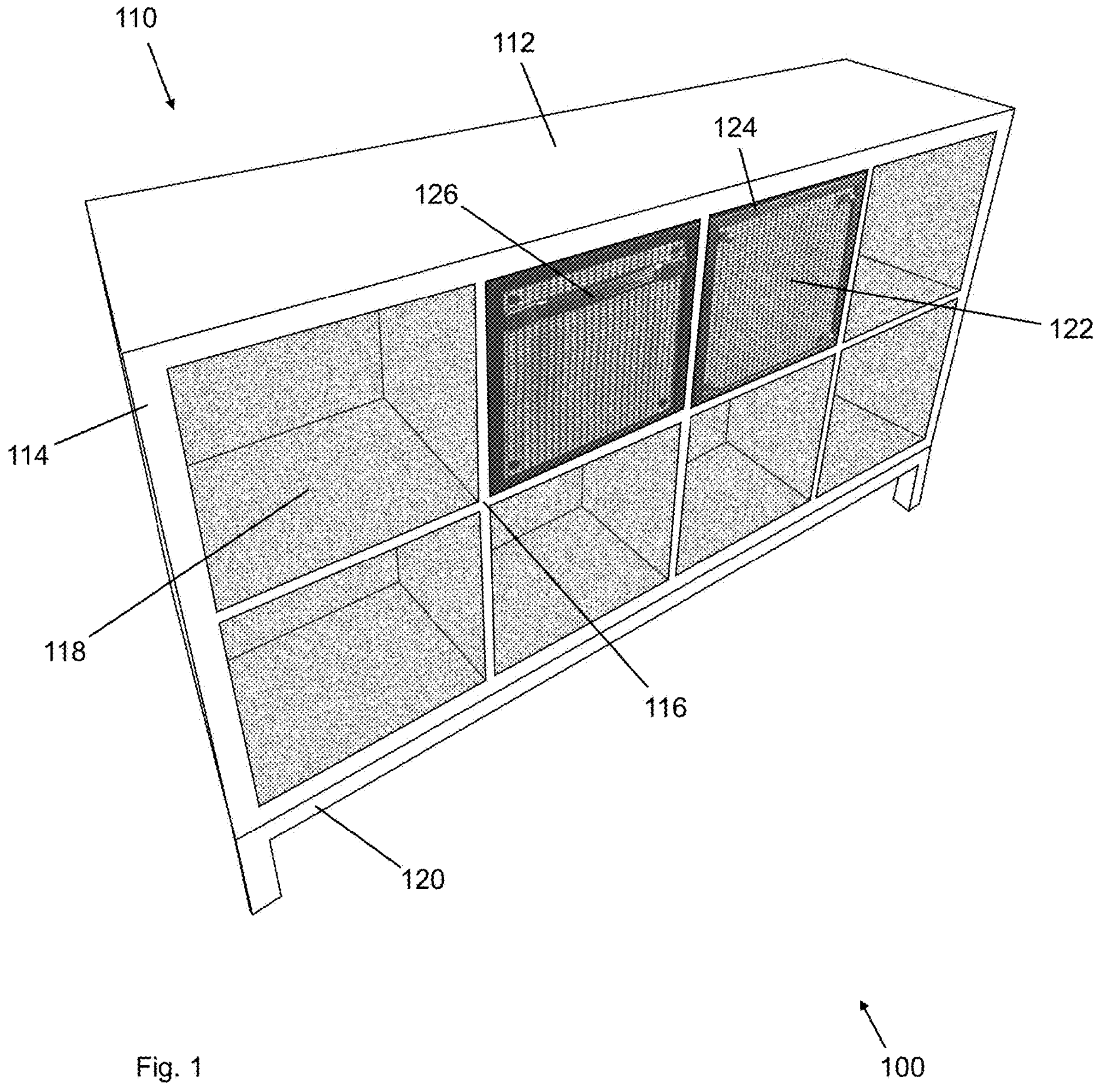
FIG. 1 illustrates a front perspective view of a modular cabinet speaker system disposed within a cavity of a furnishing in accordance with some embodiments of the present invention.

Exemplary embodiments of the present invention are illustrated in the accompanying figures. As shown in FIG. 1, a front perspective view of a modular cabinet speaker system 100 disposed within a cavity 118 of a furnishing 110 is provided. The modular cabinet speaker system 100 may be disposed within the cavity 118 of the furnishing 110 such that a front baffle of the speaker system 100 may be exposed through an opening into the cavity 118.

The front baffle of the speaker system 100 may comprise a baffle portion 122 secured in place via a baffle frame 124 which is disposed about the peripheral edges of the baffle portion 122 as shown in FIG. 1. Further, a front handle 126 may be disposed horizontally or vertically across the baffle portion 122 such that the front handle 126 is oriented parallel to two opposing side frame members of the baffle frame 124 and orthogonal to the other two opposing side frame members of the baffle frame 124. This structural arrangement is advantageous in that it provides an ergonomic manner of grasping the front handle 126 while also extending between side frame members of the baffle frame 124 so as to structurally reinforce the coupling of the front handle 126 without compromising the structure, acoustics or aesthetics of the more fragile baffle portion 122.

The furnishing 110 which houses the modular cabinet speaker system 100 may itself comprise a top surface 112, an outer frame 114, horizontal and vertical support panels 116, and a bottom support structure 120 which collectively define a plurality of square or rectangular-shaped cavities 118. Each of the cavities 118 may have only a front access opening or may have both front and rear access openings through which the one or more modular cabinet speaker systems 100 may be inserted or removed as desired using in part the front handle 126.

The square or rectangular nature of the shape of the cavities 118 is very common in home furnishings and therefore it is advantageous to not only shape the modular cabinet speaker systems 100 to accommodate this form factor for a seamless fit, but also to optimize the acoustic properties of the speaker system 100 in spite of these dimensional constraints. Further, by volumetrically encompassing all or almost all of the cavity 118 volume space, the modular cabinet speaker system 100 optimizes its aesthetic appeal as it relates to space-efficiently fitting within the finishing 110, but it also maximizes the internal air volume of the speaker system 100 which optimizes its acoustic properties. Thereby, the combination of the unique form factor and aesthetic and functional appeal of the modular cabinet speaker system 100 is generally advantageous relative existing speaker systems.

Figure 2:
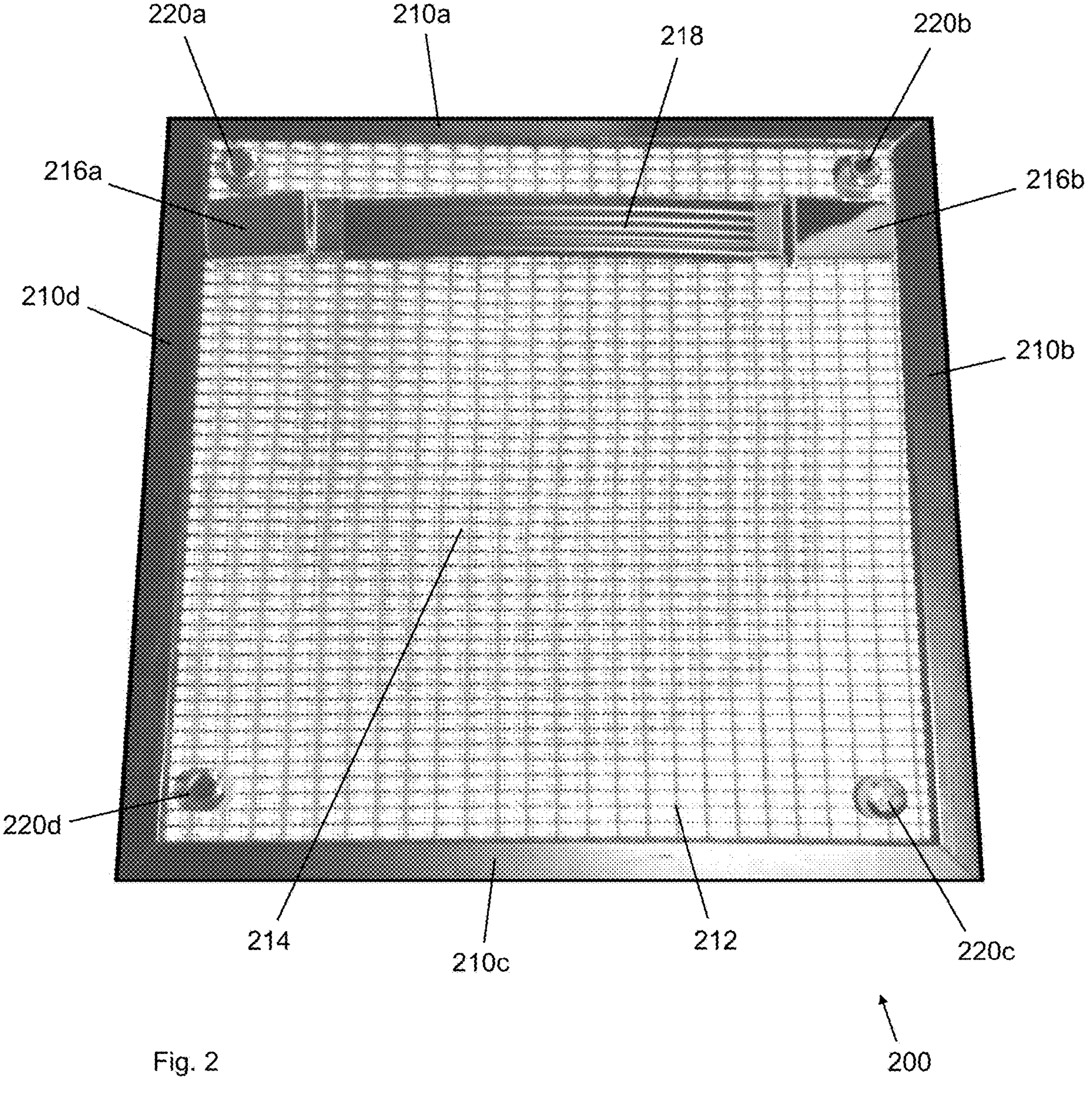
FIG. 2 illustrates a top perspective view of a front baffle of a modular cabinet speaker system that is removed from a cabinet housing in accordance with some embodiments of the present invention.

As shown in FIG. 2, a top perspective view of a front baffle 200 of a modular cabinet speaker system that is removed from a cabinet housing is provided. The front baffle 200 may comprise top, right, bottom and left frame members 210*a*-210*d* which enclose and secure in place a baffle portion 212 by enveloping the peripheral edges thereof. At the center of the baffle portion 212 is illustrated in shadow phantom a driver element 214 for delivering audible acoustic output signals. The driver element 214 may be disposed within an aperture that is formed within a front baffle panel disposed immediately behind the baffle portion 212.

A front handle is illustrated as being disposed across a horizontal extent of the baffle portion 212 and spanning the horizontal extent of the left and right frame members 210*b*, 210*d* as shown in FIG. 2. The front handle may comprise first and second coupling mechanisms 216*a*, 216*b* which secure a grasping structure 218 therebetween. The first and second coupling mechanisms 216*a*, 216*b* may be coupled through the baffle portion 212 to a rigid structure thereunder or may be coupled directly to the left and right frame members 210*b*, 210*d*.

The front baffle 200 may further utilize a plurality of tool-less removable attachment mechanisms 220*a*-220*d* shown in FIG. 2 as being disposed through each corner of the baffle portion 212 in order to secure the front baffle 200 to the cabinet housing when desired by a user. Not only do the corner locations provide structural stability to the coupling of the front baffle 200 to the cabinet housing, but it also advantageously provides structural symmetry to the front baffle 200 which increases its user appeal. The tool-less removable attachment mechanisms 220*a*-220*d* may allow the user to remove the front baffle 200 from the cabinet housing as desired in order to clean, modify, customize and the like the components contained therein such as the driver element 214.

Advantageously, the tool-less removable attachment mechanisms 220*a*-220*d* may be coupled to the cabinet housing and removed therefrom iteratively without the required use of any tools but rather only the use of the user's hands. This system of tool-less coupling and removal provides a means of rapidly and efficiently accessing the interior of the cabinet housing that is not presently provided in existing speaker systems. Further, such user-friendliness opens up many speaker customization possibilities not previously available to a user with such ease and thereby expands the market for such a niche subindustry of customization possibilities.

Figure 3:
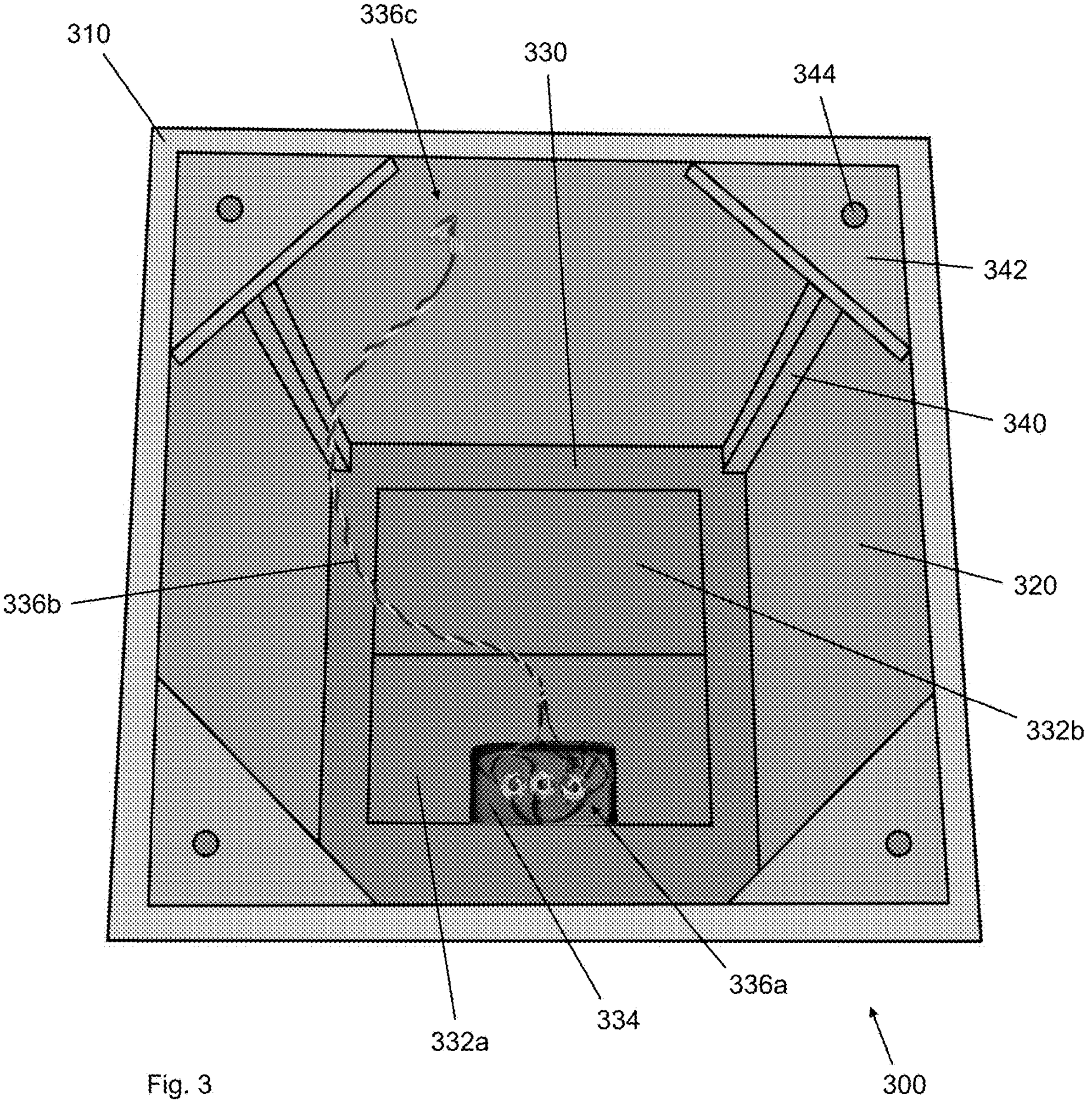
FIG. 3 illustrates a top perspective view of a front end of a cabinet housing of a modular cabinet speaker system having its front baffle removed therefrom in accordance with some embodiments of the present invention.

As shown in FIG. 3, a top perspective view of a front end of a cabinet housing 300 of a modular cabinet speaker system having its front baffle removed therefrom is provided. The cabinet housing 300 may comprise an outer frame 310 having a plurality of interior wall surfaces 320 disposed therein which each terminate into a rear baffle 330. The rear baffle 330 may comprise a top portion 332*a* and a bottom portion 332*b* each inset within a perimeter portion of the rear baffle 330 as shown in FIG. 3. Further, the top portion 332*a* may comprise an aperture 334 disposed therein through which an audio cable connector array 336*a* may be disposed. Coupled to the audio cable connector array 336*a* may be a plurality of wires 336*b* which carry electronic drive signals to a driver element via connector leads 336*c*.

Buttressing the outer frame 310 are a plurality of interior corner support structures 342 which may be disposed adjacent a front end of the outer frame 310 adjacent where a front baffle may be disposed. Each of the plurality of interior corner support structures 342 may have a generally triangular shape in order to provide optimal support to the outer frame 310 members while also offering surface area for the front baffle to couple thereto. Further, each of the plurality of interior corner support structures 342 may comprise a coupling aperture 344 disposed therethrough which may be shaped to accept a correspondingly shaped coupling member in order to secure the front baffle to the front of the outer frame 310. The coupling members may be implemented as, but are not limited to, thumb screws, machine screws, magnets and the like or any combination thereof.

Additionally, the outer frame 310 and the plurality of interior corner support structures 342 may themselves be collectively buttressed via a respectively plurality of elongate reinforcing members 340 which are designed to provide reinforcement in a direction orthogonal to that which the plurality of interior corner support structures 342 provide reinforcement. Further, the elongate reinforcing members 340 may be disposed at the corner joints of the outer frame 310 members where the interior wall surfaces 320 adjoin whereas the coupling apertures 344 may be disposed through an interior portion of the generally triangular-shaped interior corner support structures 342 and therefore disposed away from the corner joints of the outer frame 310 members where the interior wall surfaces 320 adjoin as shown in FIG. 3. This structural arrangement is advantageous in providing a robust reinforcement of the outer frame 310 and the interior corner support structures 342 when coupled to the front baffle while also providing a clear path through the coupling apertures 344 through which the front baffle may be coupled via coupling members.

Figure 4A:
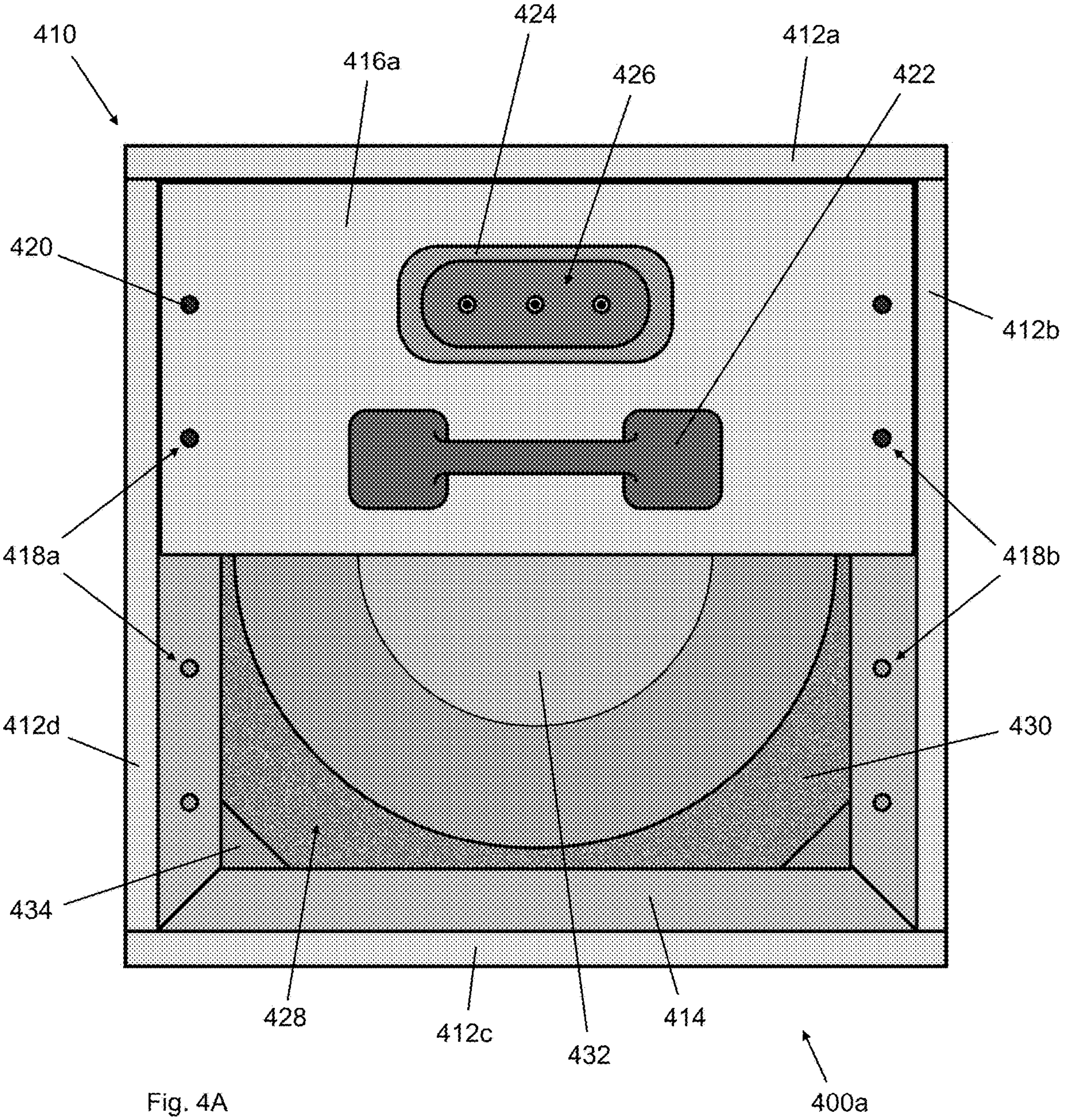
FIG. 4A illustrates a rear elevational view of a cabinet housing of a modular cabinet speaker system with a top portion of a rear baffle coupled thereto and a bottom portion of the rear baffle removed therefrom in accordance with some embodiments of the present invention.

As shown in FIG. 4A, a rear elevational view of a cabinet housing 410 of a modular cabinet speaker system 400*a* with a rear baffle top portion 416*a* coupled thereto and a rear baffle bottom portion removed therefrom is provided. The modular cabinet speaker system 400*a* may comprise the cabinet housing 410 having top, bottom, right and left frame panels 412*a*-412*d*. The lengths of the top and bottom frame panels 412*a*, 412*c* may overhang the entire thickness of the right and left frame panels 412*b*, 412*d*. Such a structural configuration is advantageous in that it optimizes the structural integrity of the cabinet housing 410 under load, such as when the user grasps the cabinet housing 410 by the front handle 126 of FIG. 1 and a rear handle 422 coupled to the rear baffle top portion 416*a*.

Further, the cabinet housing 410 may comprise a plurality of elongate peripheral reinforcing members 414 which are each disposed at least substantially along the length of each of the frame panels 412*a*-412*d* as shown in FIG. 4A. Each of these reinforcing members 414 may comprise a generally trapezoidal shape such that they collectively form a square or rectangular shape when disposed adjacent one another as shown in FIG. 4A. Further, the left reinforcing member 414 may comprise a first pair of coupling aperture pairs 418*a* and the right reinforcing member 414 may comprise a second pair of coupling aperture pairs 418*b*. Specifically, each of the aperture pairs 418*a*, 418*b* may comprise apertures that are vertically aligned with a vertical axis running along the vertical length of the left and right reinforcing members 414.

Figure 4B:
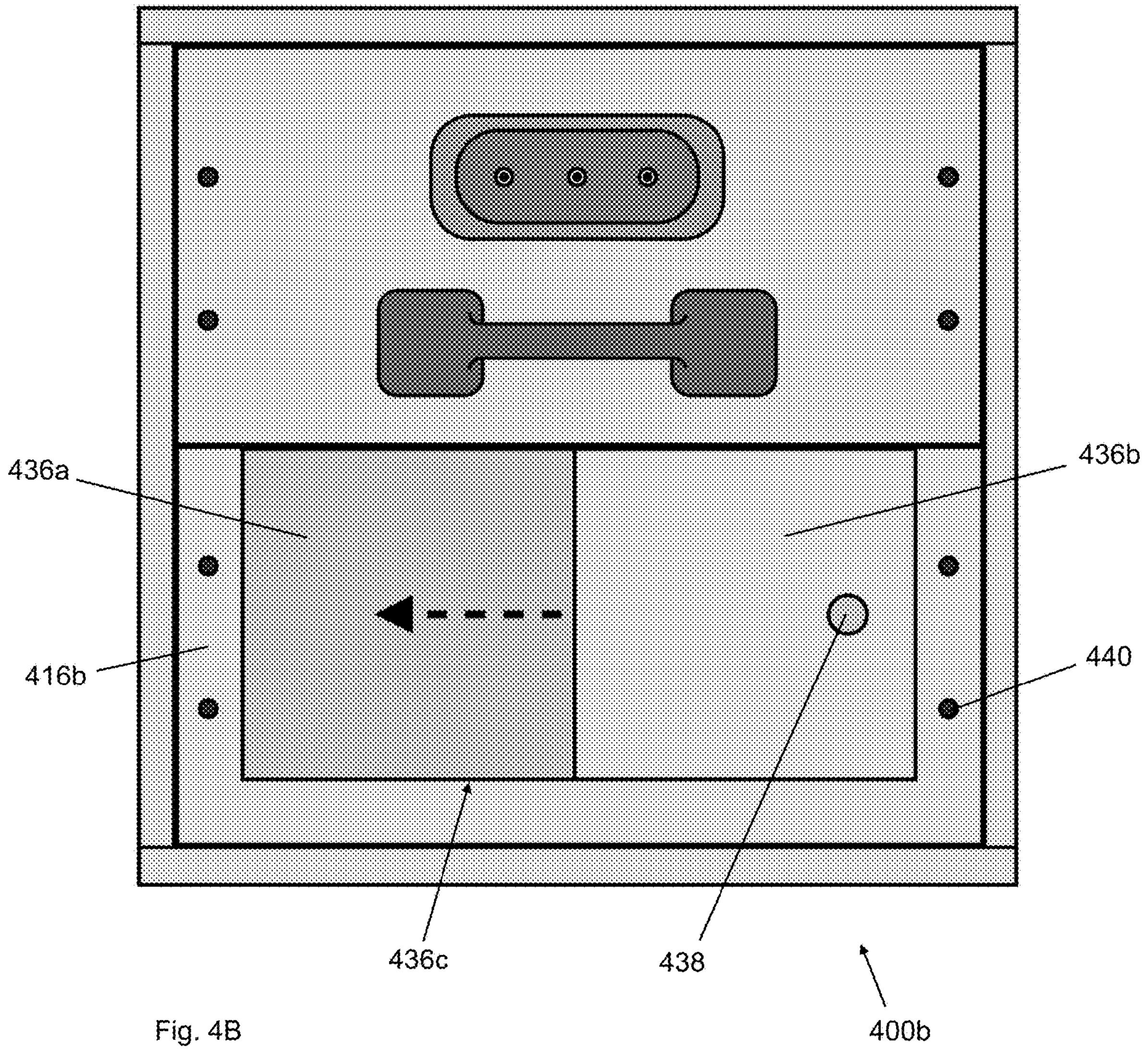
FIG. 4B illustrates a rear elevational view of a cabinet housing of a modular cabinet speaker system with first and second adjustable sliding panels of a rear baffle bottom portion disposed in a fully closed configuration in accordance with some embodiments of the present invention.

The rear baffle top portion 416*a* and a rear baffle bottom portion 416*b*, shown in FIG. 4B, may be coupled to the cabinet housing 410 via the reinforcing members 414 using an associated number of coupling elements 420 disposed through respective coupling apertures 418*a*, 418*b*. The rear baffle top portion 416*a* may further comprise the rear handle 422 disposed at a lengthwise midpoint on an external surface thereof. Similarly, the rear baffle top portion 416*a* may comprise a structural inset 424 having an audio cable connector array 426 also centered about the lengthwise midpoint on the external surface of the top portion 416*a*.

The rear baffle bottom portion 416*b*, shown in FIG. 4B, is shown in FIG. 4A as being removed from the cabinet housing 410 and therefore is not illustrated. The cavity interior 428 of the cabinet housing 410 revealed by the removed bottom portion 416*b* comprises a baffle portion 430, a driver element 432, and a plurality of interior corner support structures 434. However, only a lower half of the cavity interior is revealed in an amount that is directly proportional to the surface area of the bottom portion 416*b*. Specifically, the degree to which the surface area of the cavity interior 428 is exposed is equal to the surface area of the rear baffle bottom portion 416*b* less the surface area of half of the reinforcing members 414. This degree of exposure of the cavity interior 428 produces a first set of acoustic output parameters from the modular cabinet speaker system 400*a*.

As shown in FIG. 4B, a rear elevational view of a cabinet housing of a modular cabinet speaker system 400*b* with first and second adjustable sliding panels 436*a*, 436*b* of a rear baffle bottom portion 416*b* disposed in a fully closed configuration is provided. The rear baffle bottom portion 416*b* may comprise the first adjustable sliding panel 436*a* disposed behind, i.e. further into the cavity interior 428 of FIG. 4A, the second adjustable sliding panel 436*b* such that the second panel 436*b* may slide across the outer surface of the first panel 436*a*.

A user may slide the second panel 436*b* by grasping a panel handle 438 and sliding the second panel 436*b* through corresponding grooves built into the peripheral edges of the interior terminal edge 436*c* of the rear baffle bottom portion 416*b*. The bottom portion 416*b* is illustrated in FIG. 4B as being coupled to the cabinet housing 410 and therefore is shown as being coupled thereto via coupling elements 440 disposed through corresponding coupling apertures.

It is understood that the first and or second adjustable sliding panel 436*a*, 436*b* may be capable sliding along the aforementioned grooves, but preferably only one of the panels is allowed to translate along the grooves in order to have more finite control over the internal air volume of the cabinet housing 410. However, it would be advantageous to allow the user to decide whether both panels 436*a*, 436*b* may translate by equipping one or both of the panels 436*a*, 436*b* with a locking mechanism that locks the panels in place when desired by a user. This would allow the user to partially translate both panels and thereby create two distinct areas of exposing the cavity interior 428 which allows further customization of the acoustic output parameters of the modular cabinet speaker system 400*b*.

As illustrated in FIG. 4B, with the first and second adjustable sliding panels 436*a*, 436*b* arranged in the fully closed manner without any of the cavity interior 428 being exposed, the cavity interior 428 produces a second set of acoustic output parameters from the modular cabinet speaker system 400*a*. The second set of acoustic output parameters may be different from that of the first set of acoustic output parameters as discussed with respect to FIG. 4A.

Figure 4C:
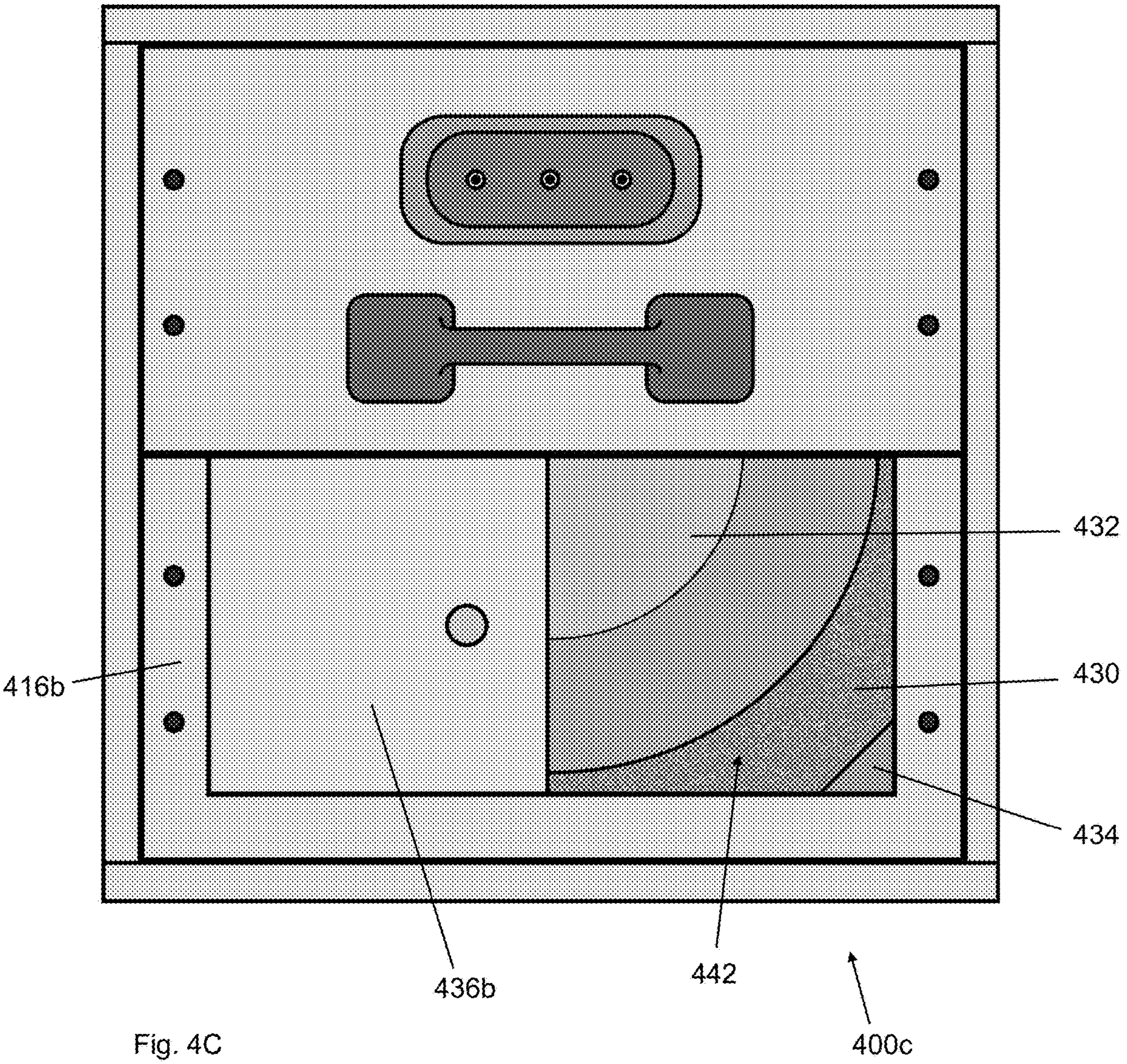
FIG. 4C illustrates a rear elevational view of a cabinet housing of a modular cabinet speaker system with first and second adjustable sliding panels of a rear baffle bottom portion disposed in a fully open configuration in accordance with some embodiments of the present invention.

As shown in FIG. 4C, a rear elevational view of a cabinet housing of a modular cabinet speaker system 400*c* with first and second adjustable sliding panels 436*a*, 436*b* of a rear baffle bottom portion 416*b* disposed in a fully open configuration is provided. In this configuration, the second panel 436*b* is fully covering the first panel 436*a* and thereby revealing a portion of the surface area of the cavity interior 428 as illustrated in FIG. 4C by illustration of the baffle portion 430, driver element 432, and interior corner support structure 434.

Specifically, the surface area 442 of exposure of the cavity interior 428 may be equal to half that of the configuration in FIG. 4A given the presence of the overlapping first and second panel 436*a*, 436*b*. This degree of exposure causes the cavity interior 428 to produce a third set of acoustic output parameters from the modular cabinet speaker system 400*c*. The third set of acoustic output parameters may be different from that of the first and second sets of acoustic output parameters with respect to the speaker systems 400*a*, 400*b* of FIGS. 4A and 4B.

Figure 4D:
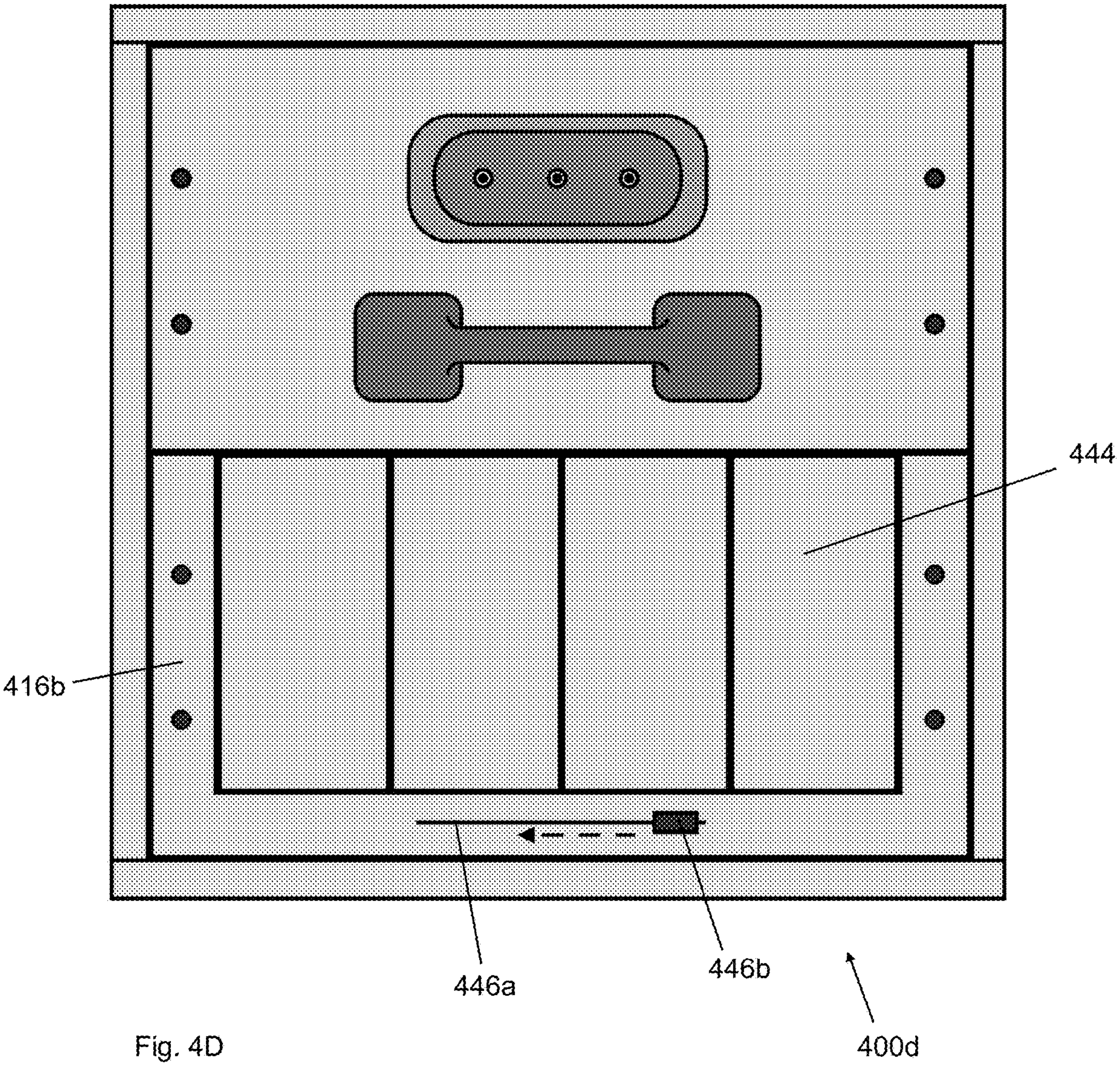
FIG. 4D illustrates a rear elevational view of a cabinet housing of a modular cabinet speaker system with an adjustable vent of the rear baffle bottom portion disposed in a first fully closed configuration in accordance with some embodiments of the present invention.

As shown in FIG. 4D, a rear elevational view of a cabinet housing of a modular cabinet speaker system 400*d* with an adjustable vent 444 of the rear baffle bottom portion 416*b* disposed in a first fully closed configuration is provided. The rear baffle bottom portion 416*b* may comprise an actuator mechanism 446*b* that translates horizontally back and forth along a corresponding grooved path 446*a*. The actuator mechanism 446*b* is illustrated as being in a furthest right position which corresponds to the first fully closed configuration of the vent 444.

In this first fully closed configuration, there is no surface area of exposure of the cavity interior 428 as the vent 444 acts as a continuous unitary structure for purposes of internal air volume and, therefore, is equivalent to the configuration of the modular cabinet speaker system 400*b* of FIG. 4B. Consequently, this first fully closed configuration causes the cavity interior 428 to produce the first set of acoustic output parameters from the modular cabinet speaker system 400*d* at least substantially equal to that of the modular cabinet speaker system 400*b* of FIG. 4B.

Figure 4E:
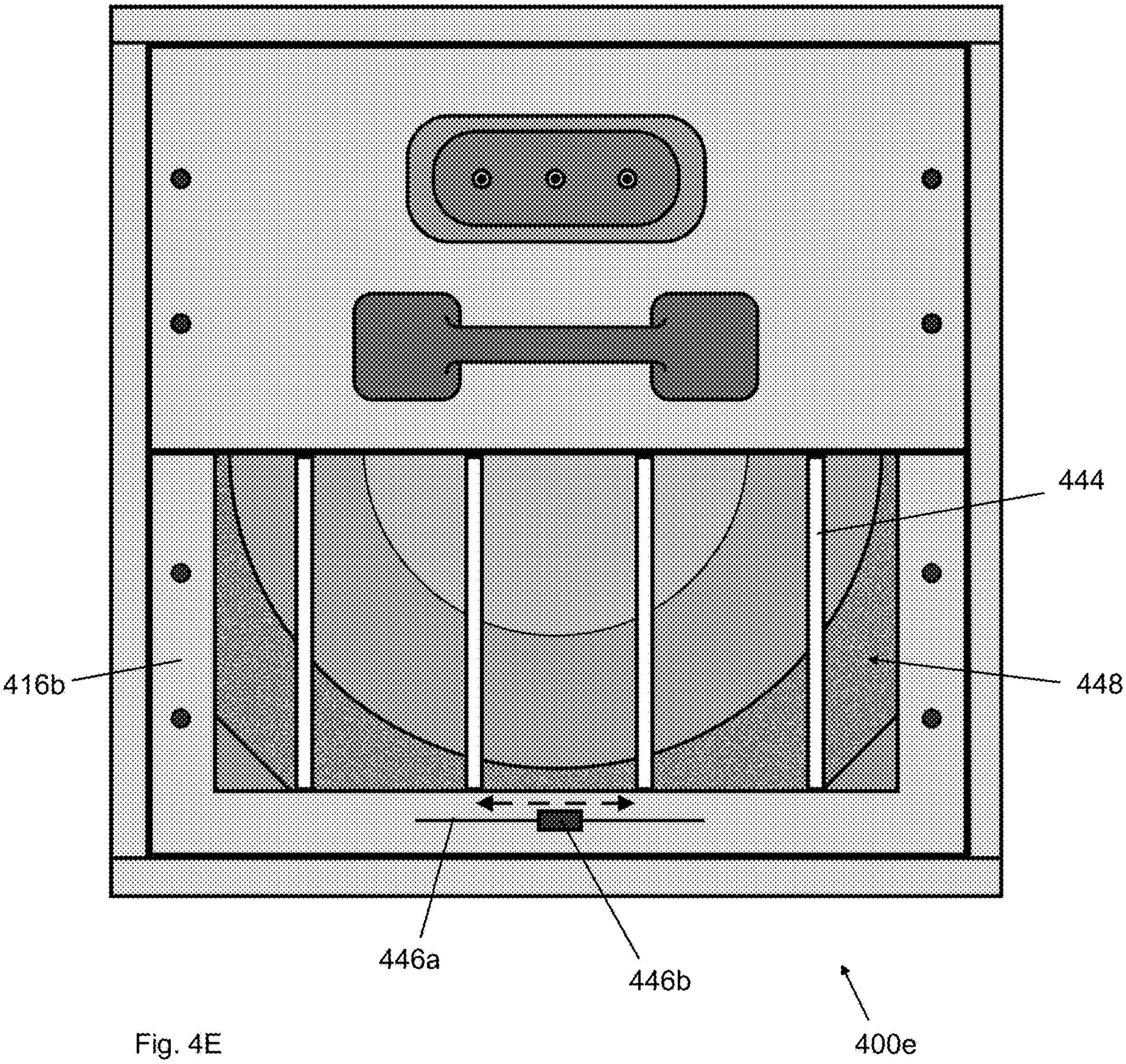
FIG. 4E illustrates a rear elevational view of a cabinet housing of a modular cabinet speaker system with an adjustable vent of the rear baffle bottom portion disposed in a fully open configuration in accordance with some embodiments of the present invention.

As shown in FIG. 4E, a rear elevational view of a cabinet housing of a modular cabinet speaker system 400*e* with an adjustable vent 444 of the rear baffle bottom portion 416*b* disposed in a fully open configuration is provided. In this fully open configuration, the actuator mechanism 446*b* is disposed at a midpoint within the grooved path 446*a* which corresponds to the vents 444 being oriented orthogonal relative the bottom portion 416*b*.

While the vents 444 are arranged in the fully open configuration, the thickness dimension of the vents 444 still partially obstructs the cavity interior 428 and therefore produces a surface area 448 of exposure that differs from that of the exposure illustrated in FIG. 4A. Consequently, this degree of exposure of the cavity interior 428 causes the cavity interior 428 to produce a fourth set of acoustic output parameters from the modular cabinet speaker system 400*e*. The fourth set of acoustic output parameters may be different from the first, second and third sets of acoustic output parameters associated with FIGS. 4A-4D.

Figure 4F:
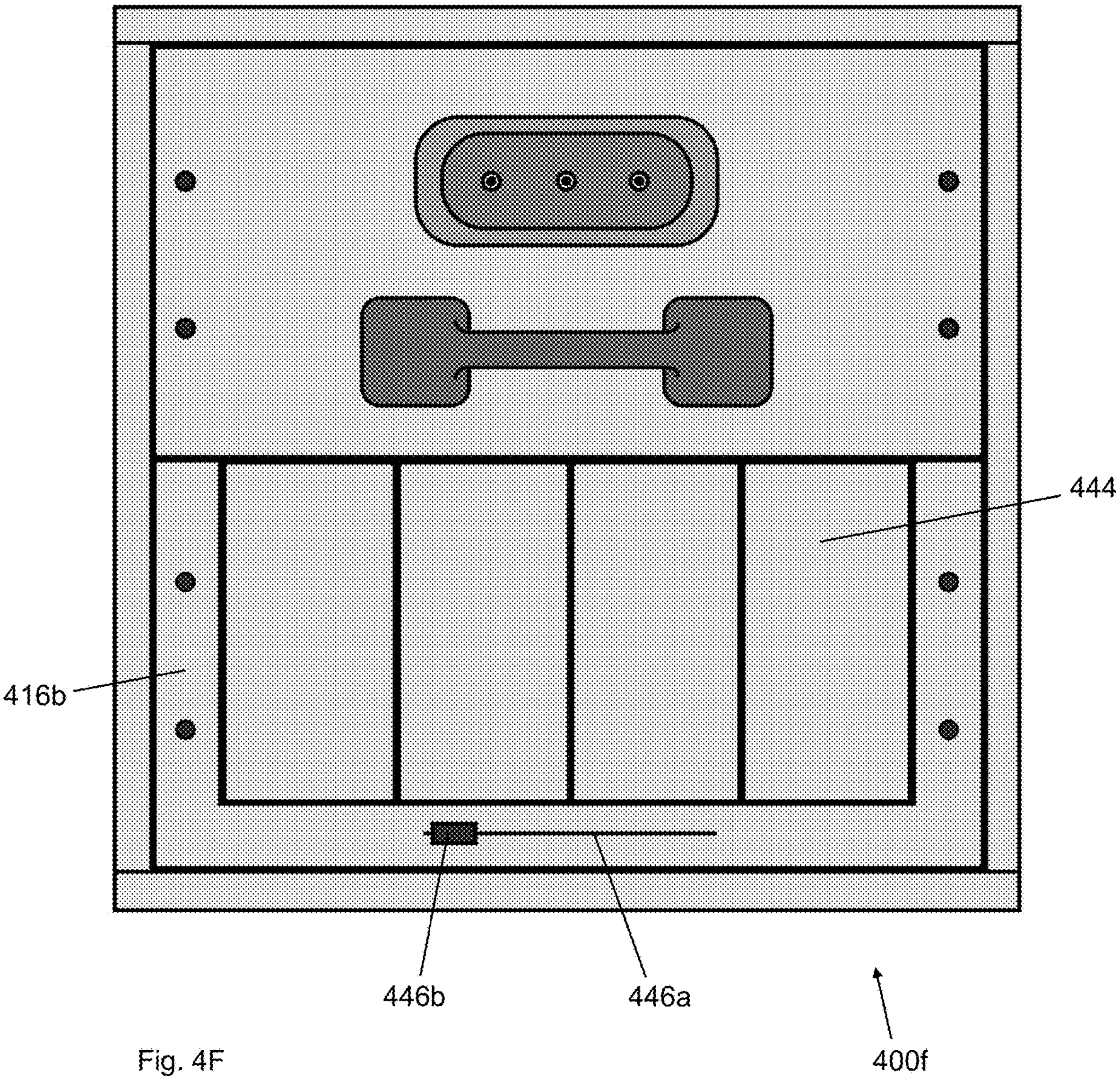
FIG. 4F illustrates a rear elevational view of a cabinet housing of a modular cabinet speaker system with an adjustable vent of the rear baffle bottom portion disposed in a second fully open configuration in accordance with some embodiments of the present invention.

As shown in FIG. 4F, a rear elevational view of a cabinet housing of a modular cabinet speaker system 400*d* with an adjustable vent 444 of the rear baffle bottom portion 416*b* disposed in a second fully closed configuration is provided. The second fully closed configuration only differs from the first fully closed configuration in that the actuator mechanism 446*b* is disposed in the furthest left position along the grooved path 446*a* which corresponds to the vents 444 being fully closed such that they are in a parallel orientation relative the bottom portion 416*b*.

In this second fully closed configuration, there is no surface area of exposure of the cavity interior 428 as the vent 444 acts as a continuous unitary structure for purposes of internal air volume and, therefore, is equivalent to the configuration of the modular cabinet speaker systems 400*b*, 400*d* of FIGS. 4B and 4D. Consequently, this second fully closed configuration causes the cavity interior 428 to produce the first set of acoustic output parameters from the modular cabinet speaker system 400*d* at least substantially equal to that of the modular cabinet speaker systems 400*b*, 400*d* of FIGS. 4B and 4D.

It is understood that the adjustable sliding panels 436*a*, 436*b* and the vent 444 may be placed into any given orientation along a range of motion and therefore several more sets of acoustic output parameters may be generated from the modular cabinet speaker system of FIGS. 4A-4F. Such a highly customizable variable functionality is advantageous in allowing the user optimal ability to hone the desired sound characteristics of the speaker system of the present invention.

Generally, the innovative design of the modular cabinet speaker system allows for an unprecedented level of customization in acoustic output parameters through the manipulation of adjustable sliding panels and vents, as depicted across FIGS. 4A-4F. This spectrum of customization directly influences the internal air volume and, consequently, the resonant frequency characteristics of the speaker enclosure. By allowing users to alter the enclosure's internal dynamics—ranging from the size and orientation of air vents to the positioning of sliding panels—this system facilitates precise control over the speaker's bass response, harmonic distortion levels, and overall sound pressure level (SPL) output.

Such granularity in acoustic customization enables users to tailor the speaker's output to the specific acoustical properties of any listening environment, thus achieving an optimal auditory experience. The capability to manually adjust these parameters not only serves to enhance the listener's engagement with their audio setup but also introduces a level of acoustic versatility that is largely absent in conventional cabinet speaker systems.

Figure 5A:
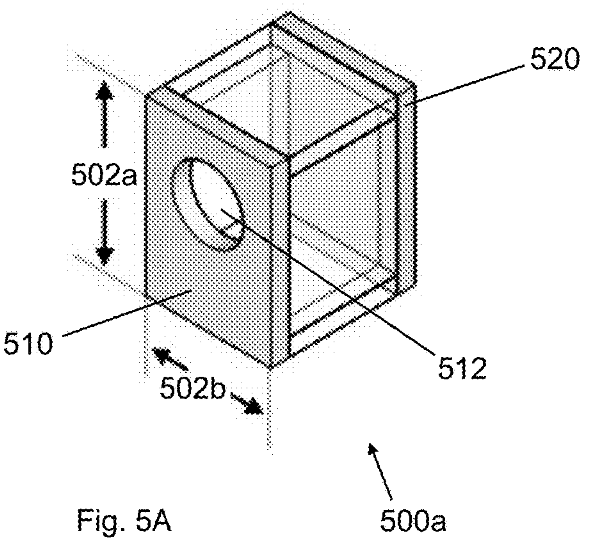
FIG. 5A illustrates a front perspective view of a cabinet housing structure of a modular cabinet speaker system in accordance with some embodiments of the present invention.

As shown in FIG. 5A, a front perspective view of a cabinet housing structure 500*a* of a modular cabinet speaker system is provided. The cabinet housing structure 500*a* highlights front and rear baffles 510, 520 both in terms of their form factor and their structural arrangement relative the other cabinet housing panels that together define the cabinet housing. The cabinet housing structure 500*a* may comprise the front baffle 510 having an insert aperture 512 for accepting a driver element therein while the rear baffle 520 has no such insert aperture.

Both the front and rear baffles 510, 520 may comprise a first length dimension 502*a* and a first width dimension 502*b*. In some embodiments, the first length dimension 502*a* and the first width dimension 502*b* may be at least substantially equal in value, thereby accommodating the form factor of the most common furnishing cavities as illustrated and described with respect to the modular cabinet speaker system 100 of FIG. 1.

Figure 5B:
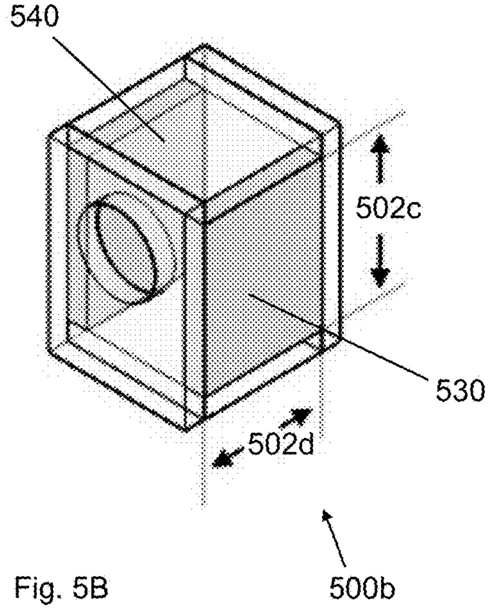
FIG. 5B illustrates a front perspective view of a cabinet housing structure of a modular cabinet speaker system in accordance with some embodiments of the present invention.

As shown in FIG. 5B, a front perspective view of a cabinet housing structure 500*b* of a modular cabinet speaker system is provided. The cabinet housing structure 500*b* may comprise left and right cabinet housing panels 530, 540 each having a second length dimension 502*c* and a first depth dimension 502*d*. Due to the overhanging nature of the front and rear baffles 510, 520 and the top and bottom cabinet housing panels 550, 560 over the left and right cabinet housing panels 530, 540, the second length dimension 502*c* may be smaller in value than that of the first length dimension 502*a*. The first depth dimension 502*d* may be larger or smaller in value than the other dimensions, but is preferably larger in value in order to optimize the acoustic output parameters from a desired internal air volume of the cabinet housing structure 500*b*.

Figure 5C:
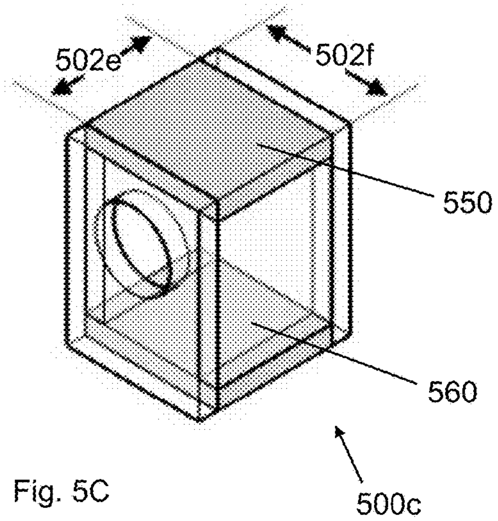
FIG. 5C illustrates a front perspective view of a cabinet housing structure of a modular cabinet speaker system in accordance with some embodiments of the present invention.

As shown in FIG. 5C, a front perspective view of a cabinet housing structure 500*c* of a modular cabinet speaker system is provided. The cabinet housing structure 500*c* may comprise top and bottom cabinet housing panels 550, 560 each having a second depth dimension 502*e* and a second width dimension 502*d*. Due to the overhanging nature of the front and rear baffles 510, 520 over the top and bottom cabinet housing panels 550, 560 in a similar manner to that of the left and right cabinet housing panels 530, 540, the second depth dimension 502*e* may have the same or similar value to that of the first depth dimension 502*d*. The second width dimension 502*f* may have the same or similar value to that of the first width dimension 502*b* given that the top and bottom cabinet housing panels 550, 560 overhang the left and right cabinet housing panels 530, 540.

An internal air volume within the cabinet housing structures 500*a*-500*c* may be selected to optimize the acoustic properties of the modular cabinet speaker system. Specifically, an internal air volume range of between 1 cubic feet and 1.5 cubic feet would be advantageous for many reasons given the context of the speaker system's intended use within a household furnishing and associated form factor as described and illustrated with respect to FIG. 1.

For example, such an internal air volume range may allow for a favorable balance between the lower frequency extension and the efficiency of the speaker. A larger internal air volume can enhance lower frequency reproduction, giving depth to the bass. This is due to the larger volume providing a greater air mass for the driver to interact with, which can reduce the resonance frequency and extend the bass response. However, too large a volume might reduce the overall efficiency and make the speaker cumbersome. The specified range keeps the cabinet size manageable for domestic spaces, while still allowing for a rich, full bass response without compromising on the speaker's sensitivity or efficiency.

This balance is optimized for a high-fidelity sound production experience, particularly in a home environment where space is at a premium and acoustic performance is highly valued. By creating a high-fidelity sound production experience, the user and any others in the audience may thereby enjoy a heightened listening experience which further drives the value of the system. The modularity of the speaker system extends its applicability beyond the home environment to small recording studios and smaller musical venues, where adaptability to various acoustic spaces and sound requirements is essential. In a small studio setting, the ability to configure speakers in series or parallel allows audio engineers to tailor the speaker setup for precise monitoring and mixing, directly influencing the quality of recorded material. For live musical performances in smaller venues, the system's versatility provides sound technicians with the tools to enhance audience experience by adjusting the setup to suit the genre, room acoustics, and volume needs, ensuring a clear and balanced sound throughout the space. This multifaceted adaptability is invaluable, making the speaker system a versatile choice for both audiophiles and professional users who demand superior sound quality and flexibility.

The internal air volume of a speaker enclosure is a fundamental determinant of its acoustic performance, particularly regarding its bass response. The specified range of 1-1.5 cubic feet is advantageous in optimizing the system's Helmholtz resonance, which is the resonant frequency of the air cavity coupled with the port of the speaker enclosure. This resonance can be harnessed to reinforce the output of low-frequency sounds. By utilizing a volume within this range, it is possible to enhance the depth and richness of the bass frequencies perceived by the listener. This occurs without necessitating an increase in the enclosure size, thus ensuring that the speaker retains a compact form factor. Such a range of the enclosure's internal volume and port dimensions enables the creation of speaker systems that deliver powerful, high-fidelity bass performance while remaining unobtrusive and compatible with a variety of living spaces and aesthetic preferences.

Additionally, the chosen volume range for the speaker enclosure also plays a critical role in the mechanical damping of the driver, which is the control over the driver's movement at its resonant frequency. A volume within the range of 1-1.5 cubic feet contributes to a more linear damping factor, meaning the driver's motion is more accurately controlled, reducing its tendency to continue to oscillate after the signal has stopped. This damping is advantageous in minimizing acoustic distortion and other unwanted alterations in the sound while improving its transient response including the speaker's ability to react quickly to changes in the audio signal. Such improvements in transient response lead to a cleaner, more accurate production and/or reproduction of audio signals, allowing for crisper and more detailed sound output, especially in the case of complex, dynamic audio outputs. This ensures that the speaker system delivers not only powerful bass but also maintains clarity and definition across the audio spectrum.

The internal air volume range of 1-1.5 cubic feet advantageously optimizes other Thiele/Small parameters, which are essential for speaker performance. For example, a correctly sized enclosure works with the compliance of the driver's suspension, represented by the compliance equivalent volume, to control the movement of the speaker cone. This control affects the electromechanical damping factor and resonant frequency, optimizing the driver's behavior at its resonant frequency and contributing to a balanced sound output. By aligning with these parameters, the speaker is enabled to operate efficiently within its optimal power bandwidth, ensuring the speaker's longevity while delivering precise acoustic performance. The internal air volume range of 1-1.5 cubic feet advantageously achieves the ideal balance between sensitivity and power handling, ensuring that the speaker can deliver detailed and dynamic audio across a wide range of frequencies.

Moreover, within the specified internal volume range, the speaker system can maintain a desirable Q factor, which quantifies the system's damping properties relating to resonance. A volume that is too small could result in an overdamped system with limited bass, while too large a volume could lead to an underdamped system with boomy, uncontrolled lows. Therefore, the 1-1.5 cubic feet volume range advantageously ensures the speaker system delivers a refined acoustic performance with precise control over the low-frequency response, tailored for optimizing audio experiences in typical home entertainment settings.

Each of the panels of the cabinet housing structure may be fabricated from materials that optimize the acoustic performance of the speaker system. In some embodiments, plywood, especially birch plywood, is advantageous for its robustness, durability, and excellent acoustic properties, contributing to a balanced sound with minimal coloration. Medium-density fiberboard is advantageous for its density and uniform texture, offering superior vibration dampening qualities that reduce unwanted resonance and enhance sound clarity. For the front baffle, materials are chosen not only for their acoustic benefits but also for their ease of customization. Interchangeable baffles made from varied materials such as wood, metal, or fabric-covered options allow for aesthetic and acoustic customization. Alternative materials may be utilized including acrylic for a modern, visually striking appearance with good sound transmissivity, carbon fiber for its high stiffness, low weight, and unique aesthetic qualities, and bamboo for its sustainable, durable properties with a distinct, natural look. This modularity enables users to tailor the speaker's appearance and sound profile, accommodating diverse preferences and room acoustics.

The described attributes of the modular cabinet speaker system coalesce into an advanced acoustic device capable of fine-tuning sound output to meet the user-defined perception of perfection. With a range of internal volumes that harmonize with the critical Thiele/Small parameters, and the ability to adjust the cabinet's acoustic damping and resonance, the system allows users to craft a soundscape finely attuned to their preferences. Whether it's achieving the ideal bass response in a home studio, the clarity needed in a small recording setting, or the fullness and presence required in a live musical venue, the speaker system provides the tools necessary for users to sculpt their audio experience. This fine level of customization ensures that the audio output, from the softest note to the most explosive transient, is reproduced with fidelity and precision, delivering a superior audio production experience.

Figure 6:
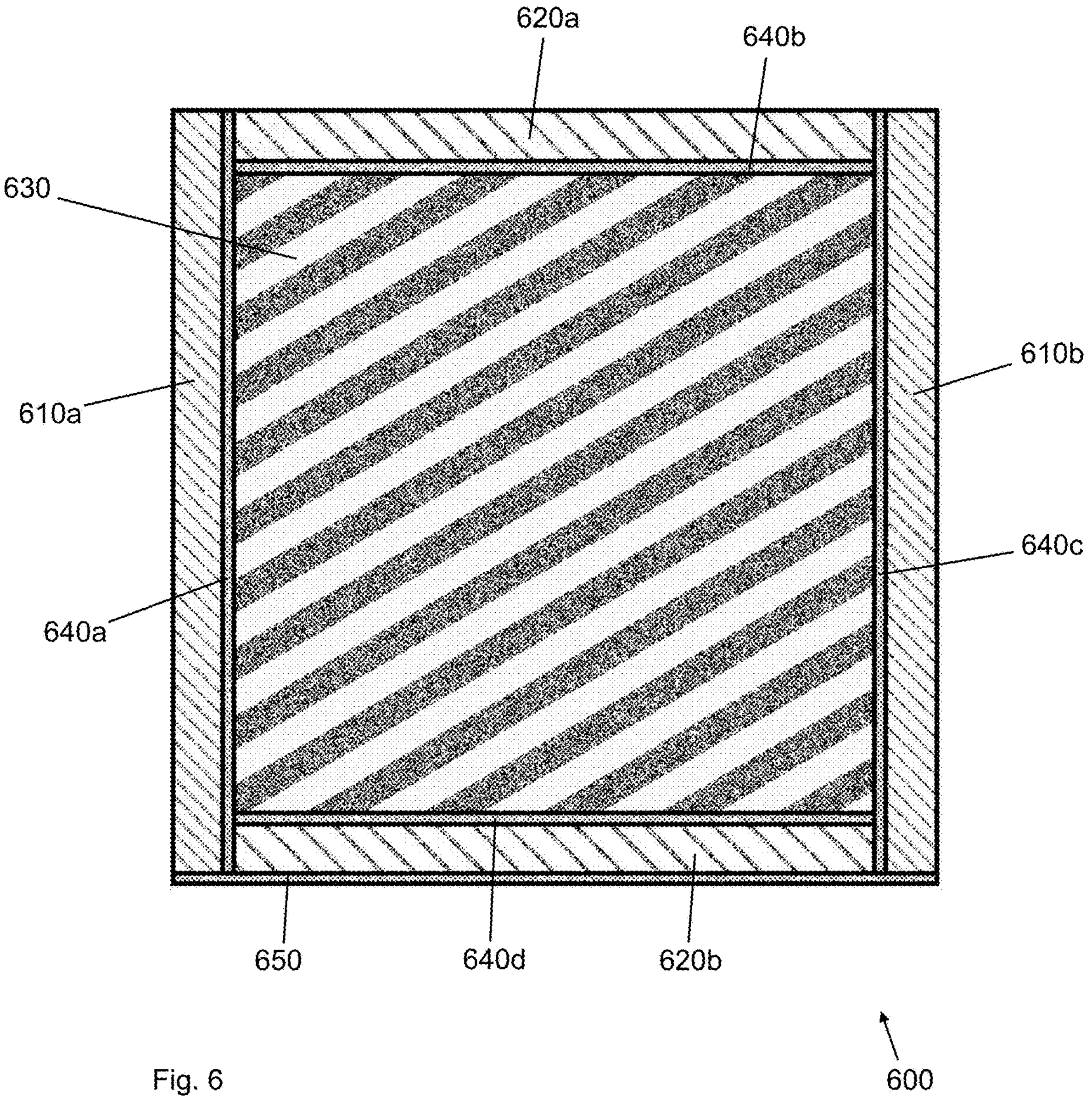
FIG. 6 illustrates a side elevational cross-sectional view of a cabinet housing structure of a modular cabinet speaker system with vibration-damping material layers disposed between a plurality of housing wall panels and underneath the modular cabinet speaker system in accordance with some embodiments of the present invention.

As shown in FIG. 6, a side elevational cross-sectional view of a cabinet housing structure 600 of a modular cabinet speaker system with a plurality of vibration-damping material layers 640*a*-640*d*, 650 disposed respectively between a plurality of baffles 610*a*, 610*b* and housing wall panels 620*a*, 620*b* and underneath the modular cabinet speaker system is provided. The front and rear baffles 610*a*, 610*b* may comprise respective vibration-damping material layers 640*a*, 640*c* disposed between them and the top and bottom wall panels 620*a*, 620*b* and side panels 630. The top and bottom wall panels 620*a*, 620*b* may comprise respective vibration-damping material layers 640*b*, 640*d* disposed between them and the side panels 630. The vibration-damping material layer 650 may be disposed between front baffle 610*a*, rear baffle 610*b*, and bottom panel 620*b* and a furnishing surface in order to reduce acoustically-generated vibrations.

The fabrication of the vibration-damping material layers utilized in the modular cabinet speaker system, as depicted in FIG. 6, may involve the use of fabrication materials and techniques to ensure optimal vibration reduction and acoustic performance. These layers may be composed of high-density viscoelastic polymers or composite materials, which provide exceptional energy-absorbing properties and ability to dissipate vibrational energy. Fabrication techniques may include layering processes where materials are precisely cut and adhered to the cabinet structure's internal surfaces, ensuring comprehensive coverage and maximal dampening effect. Additionally, techniques such as injection molding or thermoforming may be employed for more complex shapes or to integrate these materials seamlessly with other components.

Beyond these layering techniques, deposition coatings and spray coatings may also be employed for fabricating vibration-damping material layers within the modular cabinet speaker systems. Deposition techniques, such as chemical vapor deposition (CVD) and physical vapor deposition (PVD), enable the application of thin, uniform layers of damping materials onto surfaces, offering precise control over thickness and material composition. Spray coatings, utilizing pneumatically or electrically charged particles, allow for quick and even application of damping compounds over irregular shapes and surfaces. Further, alternative materials for these techniques may be utilized including silica-based aerogels, having lightweight and superior acoustic damping properties, and graphene-enhanced polymers, offering exceptional strength-to-weight ratios and vibration absorption capabilities.

Figure 7:
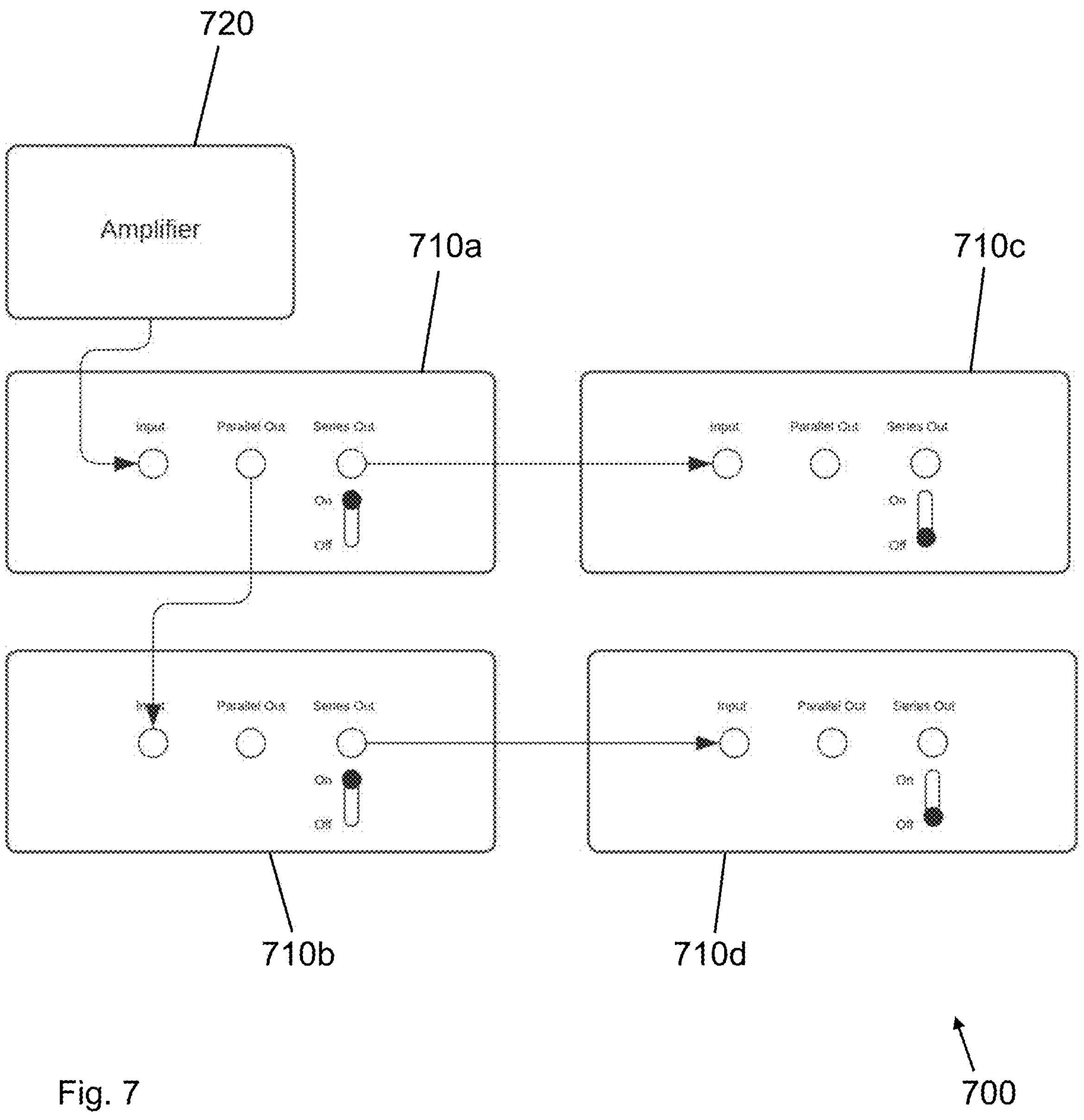
FIG. 7 illustrates a plan view of a circuit diagram of a plurality of modular cabinet speaker systems arranged in a half-stack series-parallel circuit configuration and coupled to an amplifier device in accordance with some embodiments of the present invention.

As shown in FIG. 7, a plan view of a circuit diagram of a plurality of modular cabinet speaker systems 710*a*-710*d* arranged in a half-stack series-parallel circuit configuration 700 and coupled to an amplifier device 720 is provided. Generally, FIG. 7 illustrates a circuit diagram of a series-parallel configuration, designated as 700, for interconnecting a plurality of modular cabinet speaker systems, labeled 710*a* through 710*d*, to an amplifier device 720. Each speaker system includes an input, a parallel output, and a series output, with an on/off switch to control the flow of the signal. The configuration enables the combination of series and parallel wiring methods, facilitating the management of overall system impedance and allowing for an efficient distribution of power from the amplifier. This versatile wiring approach allows for the modular speaker systems to be customized in array setups while optimizing the electrical load and acoustic performance across the array. The series-parallel arrangement is advantageous for maintaining a consistent load on the amplifier, which is critical for preventing damage to the amplifier and speakers, as well as for ensuring optimal sound quality and system reliability.

In some embodiments, the amplifier device 720 may be implemented unitarily in combination with one or more of the speaker systems 710*a*-710*d* in the form of a combo amp. Further, while a half-stack configuration is being illustrated in FIG. 7, it is understood to be within the scope of the present invention that a quarter-stack configuration, i.e. two speaker systems, a full-stack configuration, i.e. eight speaker systems, and the like may be utilized alternatively or in association with the configuration of FIG. 7 and any of the other embodiments of the present invention described or contemplated.

By selectively arranging the modular cabinet speaker systems 710*a*-710*d* in series or parallel connections, users can fine-tune the overall impedance to match the optimal operating conditions of the amplifier 720. This precise impedance matching is essential for maximizing the speakers' performance characteristics such as frequency response, damping factor, and power handling. Additionally, the user can modify the arrangement to control the distribution of power to each speaker, thereby customizing the sound stage, volume levels across different speakers, and ultimately shaping the sonic environment to their preference. Such flexibility in configuration leads to a highly personalized audio experience, where the spatial distribution and sound quality can be adapted to various acoustic spaces and listening scenarios.

The modular cabinet speaker system may be designed with an essential limitation concerning impedance matching, ensuring that the combined impedance of the connected cabinets corresponds with the output impedance of the chosen amplifier. The system's configurations may be restricted to combinations that achieve resultant impedances of 4, 8, or 16 ohms. This compliance may be critical to prevent damage to the amplifier that may occur from connecting a load impedance too low for the amplifier's rating, potentially leading to overheating and failure. Conversely, excessively high load impedance may reduce the system's efficiency and impair the amplifier's maximum power output and audio fidelity.

Inherent to the modularity of the speaker system is the principle that power distribution among various drivers follows the laws of a voltage divider. This limitation indicates that drivers connected in a series-parallel configuration do not receive equal power. When designing configurations, particularly those combining drivers of different impedances, consideration must be given to how the power is allocated. Lower impedance drivers will draw more power than their higher impedance counterparts, influencing the overall volume and sound balance. This principle dictates that configurations be designed to ensure an intended distribution of power that matches the desired acoustic output.

The cabinet speaker system's modularity is subject to the power handling capacity of individual drivers and the total power output of the amplifier. Configurations may be be limited to ensure that each cabinet, within a multi-cabinet setup, receives sufficient power to meet its performance capabilities without the risk of underpowering. The total number of cabinets that can be electrically linked may therefore be dependent on the amplifier's wattage, ensuring that the system can deliver the anticipated sound levels and quality.

The electrical interconnectivity of the modular cabinet speaker system adheres to established electrical circuit rules. The permissible configurations may be those that correctly apply series and parallel connections to obtain the target total impedance. In series, the impedances of individual cabinets sum up, while in parallel, the total impedance is derived from the reciprocal sum of the reciprocals of each cabinet's impedance. Therefore, possible configurations may be judiciously planned to not only achieve the required total impedance but also to align with the system's power and acoustic performance goals. These principles guide the allowable configurations, safeguarding the system's integrity and ensuring that the acoustic output is finely tuned to the user's specifications.

Given the prevalence of 8 ohm cabinet speakers in the market and the corresponding familiarity that users have with 8 ohm cabinet speakers (along with the prevalence of 4, 8 or 16 ohm amplifiers), it would be advantageous for the modular cabinet speaker system (when integrated with other modular cabinet speaker systems) to provide configurations that would meet these needs in the market while still providing the customized fine-tuning of output sound previously discussed. Some particularly advantageous exemplary configurations are provided immediately below.

Two Speaker System-4 Ohm Resultant Impedance Configuration: For users requiring a 4-ohm impedance to match certain amplifier outputs, two 8-ohm identical modular cabinet speaker systems can be connected in parallel. This configuration halves the individual impedance of 8 ohms to achieve a combined impedance of 4 ohms. Such a setup is advantageous for amplifiers that operate most efficiently at a 4-ohm load, optimizing power output and speaker responsiveness.

Two Speaker System-16 Ohm Resultant Impedance Configuration: When a 16-ohm impedance is preferred, typically for amplifiers designed for higher impedance loads or for a more vintage sound, two 8-ohm speaker systems can be serially connected. The impedance values add up in a series, resulting in a total impedance of 16 ohms. This configuration is particularly useful for users looking to achieve a classic tone that is often associated with higher impedance loads.

Four Speaker System-8 Ohm Resultant Impedance Configuration: An 8-ohm resultant impedance from four identical speaker systems, each with an 8-ohm impedance, is accomplished by creating two series pairs and then connecting those pairs in parallel. This series-parallel arrangement maintains the original impedance of a single speaker, ensuring consistent power handling and sound quality across all speakers. This is ideal for users who wish to maintain the amplifier's optimal operating conditions without altering the sound character that is inherent to a single 8-ohm speaker system.

Eight Speaker System-4 Ohm Resultant Impedance Configuration: To achieve a 4-ohm load using eight identical 8-ohm speaker systems, the optimal configuration involves creating four series pairs and then connecting all pairs in parallel. This extensive arrangement leverages the benefits of both series and parallel wiring to maintain a low impedance, facilitating the use of amplifiers that are optimized for 4-ohm loads while enabling considerable sound output suitable for larger venues or fuller sound in spacious environments.

Eight Speaker System-16 Ohm Resultant Impedance Configuration: For a total impedance of 16 ohms utilizing eight 8-ohm speaker systems, the configuration requires two groups of four speakers connected in series, with the total impedance of each group being 32 ohms, followed by the parallel connection of these two groups. This results in a high impedance load, which can be beneficial for achieving certain tonal characteristics, as well as accommodating vintage or specialized amplifiers that match this impedance level. This setup can also preserve the nuances of the speaker's natural tone, while still providing the option to expand the system for larger arrays.

Figure 8:
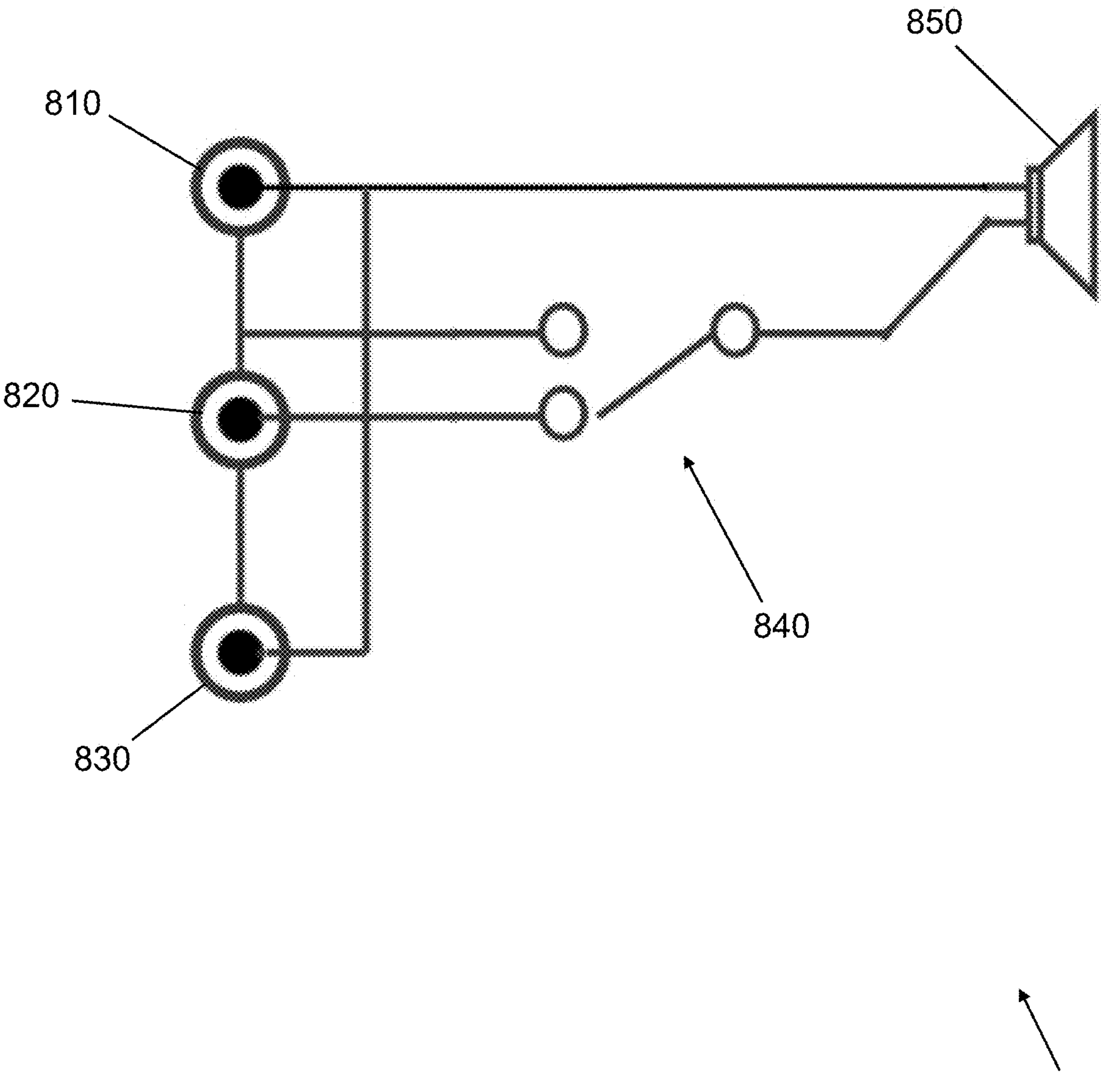
FIG. 8 illustrates a plan view of a circuit diagram of the internal wiring of a modular cabinet speaker system in accordance with some embodiments of the present invention.

As shown in FIG. 8, a plan view of a circuit diagram of the internal wiring of a modular cabinet speaker system 800 is provided. The internal circuit may utilize a plurality of jacks 810-830 and a switch 850, which together enable various configurations in connecting multiple cabinet speakers. In one embodiment, the plurality of jacks 810-830 may be implemented as three ¼" jacks and the switch 840 may be implemented as a single pole double throw (SPDT) switch.

A first jack 810 of the plurality of jacks serves as the Input, receiving the audio signal from the amplifier or preceding speaker in the chain. A second jack 820 of the plurality of jacks may serve as the Serial Output jack in order to facilitate the continuation of the signal to another speaker in a series configuration, whereas a third jack 830 of the plurality of jacks may serve as the Parallel Output jack in order to enable parallel connectivity. This design allows for the user to manipulate the overall load impedance seen by the amplifier, which is essential for optimizing performance and maintaining the integrity of the system 800 across multiple speakers.

Central to the system's functionality is the switch 840, which toggles the return path of a speaker driver 850 between the second jack 820 and the common ground shared by all jacks 810-830. In a first position, the switch 840 connects the driver's 850 return to the Serial Out, effectively creating a series link with subsequent speakers. In a second position, the return is looped to the shared ground, appropriate for parallel connections. This switching mechanism, therefore, allows for on-the-fly adaptability, providing the user with a means to effortlessly switch between serial and parallel configurations without the need for rewiring or technical intervention.

By functionally tying the Input Positive and Parallel Output Positive together, and controlling the Serial Out with the switch 840, the modular cabinet speaker system 800 ensures that the user can configure the impedance load according to the requirements of different environments and amplifiers. Such a system is not only advantageous for its acoustic versatility but also for its ease of use, allowing even non-technical users to achieve professional-level sound customization.

In some embodiments of FIGS. 1-8, a modular cabinet speaker system is provided comprising a cabinet housing comprising a top panel, a bottom panel, a left panel, and a right panel, wherein the top panel, the bottom panel, the left panel, and the right panel define a cabinet housing cavity interior; a front baffle disposed over and removably coupled to the top panel, the bottom panel, the left panel, and the right panel, wherein: the front baffle comprises a top frame member, a bottom frame member, a left frame member, and a right frame member which are coupled to peripheral edges of a baffle portion; a rear baffle disposed over and removably coupled to the top panel, the bottom panel, the left panel, and the right panel, wherein: the rear baffle is removably coupled to a plurality of peripheral reinforcing members; and the cabinet housing cavity interior comprises an internal air volume at least in part defined by the top panel, the bottom panel, the left panel, the right panel, the front baffle and the rear baffle.

In some embodiments of FIGS. 1-8, the cabinet housing comprises a cross-sectionally square shape in a first plane, the cabinet housing comprises a first cross-sectionally rectangular shape in a second plane that is oriented orthogonal to the first plane, the cabinet housing comprises a second cross-sectionally rectangular shape in a third plane that is oriented orthogonal to both the first plane and the second plane, the front baffle is oriented parallel to the first plane, and the rear baffle is oriented parallel to the first plane.

In some embodiments of FIGS. 1-8, the top panel is oriented parallel to the second plane, the bottom panel is oriented parallel to the second plane, the left panel is oriented parallel to the third plane, the right panel is oriented parallel to the third plane, the first and second cross-sectionally rectangular shapes comprise equal surface area values, the first cross-sectionally rectangular shape comprises a first height value equal to a first length value of the second cross-sectionally rectangular shape, and the second cross-sectionally rectangular shape comprises a second height value equal to a second length value of the first cross-sectionally rectangular shape.

In some embodiments of FIGS. 1-8, the front handle is disposed within a top half portion of the front baffle, the rear handle is disposed within a top half portion of the rear baffle, the front and rear handles are respectively disposed at equal height values within the top half portions of the front and rear baffles, a first input jack disposed adjacent the rear baffle and coupled to an amplifier; a first parallel out jack disposed adjacent the first input jack; and a first series out jack disposed adjacent the first parallel out jack, the modular cabinet speaker system is the first modular cabinet speaker system of a plurality of modular cabinet speaker systems; and a second modular cabinet speaker system of the plurality of modular cabinet speaker systems is coupled to the first modular cabinet speaker system, a structural inset comprising an audio cable connector array is disposed within the top half portion of the rear baffle, the top half portion of the rear baffle comprises a plurality of pairs of coupling apertures, and each of the plurality of pairs of coupling apertures are disposed along peripheral edges of the top half portion of the rear baffle.

In some embodiments of FIGS. 1-8, a modular cabinet speaker system, comprising: a cabinet housing comprising a top panel, a bottom panel, a left panel, and a right panel, wherein the top panel, the bottom panel, the left panel, and the right panel define a cabinet housing cavity interior; a front baffle partially disposed over and removably coupled to front side surfaces of the top panel, the bottom panel, the left panel, and the right panel, wherein: the front baffle comprises a top frame member, a bottom frame member, a left frame member, and a right frame member which are coupled to peripheral edges of a baffle portion, the front baffle is removably coupled to front side surfaces of the top panel, the bottom panel, the left panel, and the right panel via a plurality of tool-less removable attachment mechanisms, the plurality of tool-less removable attachment mechanisms are each respectively disposed through a coupling aperture of a plurality of coupling apertures, each of the plurality of coupling apertures are respectively disposed through an interior corner support structure of a plurality of interior corner support structures; a rear baffle disposed over and removably coupled to the top panel, the bottom panel, the left panel, and the right panel; the rear baffle is removably coupled to a plurality of elongate peripheral reinforcing members; and the cabinet housing cavity interior comprises an internal air volume at least in part defined by the top panel, the bottom panel, the left panel, the right panel, the front baffle and the rear baffle.

In some embodiments of FIGS. 1-8, a modular cabinet speaker system, comprising: a cabinet housing comprising a top panel parallel to and opposite a bottom panel and a left panel parallel to and opposite a right panel, wherein: the top panel, the bottom panel, the left panel, and the right panel define a cabinet housing cavity interior, and the top and bottom panels are oriented orthogonal relative the left and right panels; a front baffle disposed over and removably coupled to the top panel, the bottom panel, the left panel, and the right panel, wherein: the front baffle comprises a top frame member, a bottom frame member, a left frame member, and a right frame member which are coupled to peripheral edges of a baffle portion; a rear baffle partially disposed over and partially removably coupled to rear side surfaces of the top panel, the bottom panel, the left panel, and the right panel, wherein: the rear baffle is removably coupled to a plurality of elongate peripheral reinforcing members, the rear baffle comprises a top portion and a bottom portion, the rear baffle top portion is permanently coupled to the rear side surfaces of the top panel, the left panel, and the right panel, and the rear baffle bottom portion is removably coupled to rear side surfaces of the bottom panel, the left panel, and the right panel; and the cabinet housing cavity interior comprises an internal air volume at least in part defined by the top panel, the bottom panel, the left panel, the right panel, the front baffle and the rear baffle.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All features disclosed in the specification, claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase 'removably coupled' and similar terms and phrases are intended to convey that a given element may be iteratively coupled to and removed from another given element as desired. For example, a male plug of a first extension cord may be removably coupled to a female plug of a second extension cord as desired.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "coupled" or "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A modular cabinet speaker system, comprising:

a cabinet housing comprising a top panel, a bottom panel, a left panel, and a right panel, wherein the top panel, the bottom panel, the left panel, and the right panel define a cabinet housing cavity interior;

a front baffle disposed over and removably coupled to the top panel, the bottom panel, the left panel, and the right panel, wherein:

the front baffle comprises a top frame member, a bottom frame member, a left frame member, and a right frame member which are coupled to peripheral edges of a baffle portion;

a rear baffle disposed over and removably coupled to the top panel, the bottom panel, the left panel, and the right panel, wherein:

the rear baffle is removably coupled to a plurality of peripheral reinforcing members; and the cabinet housing cavity interior comprises an internal air volume at least in part defined by the top panel, the bottom panel, the left panel, the right panel, the front baffle and the rear baffle.

2. The modular cabinet speaker system of claim 1, wherein the cabinet housing comprises a cross-sectionally square shape in a first plane.

3. The modular cabinet speaker system of claim 2, wherein the cabinet housing comprises a first cross-sectionally rectangular shape in a second plane that is oriented orthogonal to the first plane.

4. The modular cabinet speaker system of claim 3, wherein the cabinet housing comprises a second cross-sectionally rectangular shape in a third plane that is oriented orthogonal to both the first plane and the second plane.

5. The modular cabinet speaker system of claim 4, wherein the front baffle is oriented parallel to the first plane.

6. The modular cabinet speaker system of claim 5, wherein the rear baffle is oriented parallel to the first plane.

7. The modular cabinet speaker system of claim 4, wherein the top panel is oriented parallel to the second plane.

8. The modular cabinet speaker system of claim 4, wherein the left panel is oriented parallel to the third plane.

9. The modular cabinet speaker system of claim 4, wherein the first and second cross-sectionally rectangular shapes comprise equal surface area values.

10. The modular cabinet speaker system of claim 4, wherein:

the first cross-sectionally rectangular shape comprises a first height value equal to a first length value of the second cross-sectionally rectangular shape; and the second cross-sectionally rectangular shape comprises a second height value equal to a second length value of the first cross-sectionally rectangular shape.

11. The modular cabinet speaker system of claim 1, further comprising:

a front handle disposed within a top half portion of the front baffle;

a rear handle disposed within a top half portion of the rear baffle; and the front and rear handles are respectively disposed at equal height values within the top half portions of the front and rear baffles.

12. The modular cabinet speaker system of claim 1, further comprising:

a first input jack disposed adjacent the rear baffle and coupled to an amplifier;

a first parallel out jack disposed adjacent the first input jack; and a first series out jack disposed adjacent the first parallel out jack.

13. The modular cabinet speaker system of claim 1, wherein:

the modular cabinet speaker system is the first modular cabinet speaker system of a plurality of modular cabinet speaker systems; and a second modular cabinet speaker system of the plurality of modular cabinet speaker systems is coupled to the first modular cabinet speaker system.

14. The modular cabinet speaker system of claim 1, wherein a structural inset comprising an audio cable connector array is disposed within a top half portion of the rear baffle.

15. The modular cabinet speaker system of claim 14, wherein the top half portion of the rear baffle comprises a plurality of pairs of coupling apertures.

16. The modular cabinet speaker system of claim 15, wherein each of the plurality of pairs of coupling apertures are disposed along peripheral edges of the top half portion of the rear baffle.

17. A modular cabinet speaker system, comprising:

a cabinet housing comprising a top panel, a bottom panel, a left panel, and a right panel, wherein the top panel, the bottom panel, the left panel, and the right panel define a cabinet housing cavity interior;

a front baffle partially disposed over and removably coupled to front side surfaces of the top panel, the bottom panel, the left panel, and the right panel, wherein:

the front baffle comprises a top frame member, a bottom frame member, a left frame member, and a right frame member which are coupled to peripheral edges of a baffle portion, the front baffle is removably coupled to front side surfaces of the top panel, the bottom panel, the left panel, and the right panel via a plurality of tool-less removable attachment mechanisms, the plurality of tool-less removable attachment mechanisms are each respectively disposed through a coupling aperture of a plurality of coupling apertures, and each of the plurality of coupling apertures are respectively disposed through an interior support structure of a plurality of interior support structures, wherein each of the plurality of interior support structures are disposed within the cabinet housing cavity interior adjacent at least one corner of the front baffle;

a rear baffle disposed over and removably coupled to the top panel, the bottom panel, the left panel, and the right panel, wherein:

the rear baffle is removably coupled to a plurality of elongate peripheral reinforcing members; and the cabinet housing cavity interior comprises an internal air volume at least in part defined by the top panel, the bottom panel, the left panel, the right panel, the front baffle and the rear baffle.

18. A modular cabinet speaker system, comprising:

a cabinet housing comprising a top panel parallel to and opposite a bottom panel and a left panel parallel to and opposite a right panel, wherein:

the top panel, the bottom panel, the left panel, and the right panel define a cabinet housing cavity interior, and the top and bottom panels are oriented orthogonal relative the left and right panels;

a front baffle disposed over and removably coupled to the top panel, the bottom panel, the left panel, and the right panel, wherein:

the front baffle comprises a top frame member, a bottom frame member, a left frame member, and a right frame member which are coupled to peripheral edges of a baffle portion;

a rear baffle partially disposed over and partially removably coupled to rear side surfaces of the top panel, the bottom panel, the left panel, and the right panel, wherein:

the rear baffle is removably coupled to a plurality of elongate peripheral reinforcing members, the rear baffle comprises a top portion and a bottom portion, wherein the top portion is structurally discontinuous from and wholly disposed above the bottom portion, the rear baffle top portion is permanently coupled to the rear side surfaces of the top panel, the left panel, and the right panel, and the rear baffle bottom portion is removably coupled to rear side surfaces of the bottom panel, the left panel, and the right panel; and the cabinet housing cavity interior comprises an internal air volume at least in part defined by the top panel, the bottom panel, the left panel, the right panel, the front baffle and the rear baffle.

19. The modular cabinet speaker system of claim 1, wherein:

the rear baffle comprises a top portion and a bottom portion, and the bottom portion comprises a structure that translates to expose the cabinet housing cavity interior through the bottom portion.

20. The modular cabinet speaker system of claim 1, wherein:

the rear baffle comprises a top portion and a bottom portion, the top portion is wholly disposed above the bottom portion, the top portion comprises a structural inset disposed therein, and the bottom portion comprises a closable opening that exposes the cabinet housing cavity interior when in an open configuration and encloses the cabinet housing cavity interior when in a closed configuration.

* * * * *